United States Patent
Liu et al.

(10) Patent No.: US 11,179,705 B2
(45) Date of Patent: Nov. 23, 2021

(54) MODIFIED Y-TYPE MOLECULAR SIEVE AND PREPARATION METHOD THEREOF, HYDROCRACKING CATALYST AND PREPARATION METHOD THEREOF, AND METHOD FOR HYDROCRACKING HYDROCARBON OIL

(71) Applicants: CHINA PETROLEUM & CHEMICAL CORPORATION, Beijing (CN); Dalian Research Institute of Petroleum and Petrochemicals, SINOPEC CORP., Liaoning (CN)

(72) Inventors: Wei Liu, Liaoning (CN); Minghua Guan, Liaoning (CN); Yanze Du, Liaoning (CN); Fenglai Wang, Liaoning (CN); Bo Qin, Liaoning (CN); Hang Gao, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 0 days.

(21) Appl. No.: 16/768,070

(22) PCT Filed: Nov. 29, 2017

(86) PCT No.: PCT/CN2017/113629
§ 371 (c)(1),
(2) Date: May 28, 2020

(87) PCT Pub. No.: WO2019/104543
PCT Pub. Date: Jun. 6, 2019

(65) Prior Publication Data
US 2020/0306736 A1    Oct. 1, 2020

(51) Int. Cl.
| | |
|---|---|
| *B01J 29/16* | (2006.01) |
| *B01J 35/10* | (2006.01) |
| *B01J 37/08* | (2006.01) |
| *B01J 37/10* | (2006.01) |
| *B01J 37/30* | (2006.01) |
| *C10G 47/20* | (2006.01) |
| *B01J 29/08* | (2006.01) |
| *B01J 29/14* | (2006.01) |
| *B01J 35/00* | (2006.01) |

(Continued)

(52) U.S. Cl.
CPC ............ *B01J 29/166* (2013.01); *B01J 29/08* (2013.01); *B01J 29/084* (2013.01); *B01J 29/146* (2013.01); *B01J 29/16* (2013.01); *B01J 35/0006* (2013.01); *B01J 35/1023* (2013.01); *B01J 35/1038* (2013.01); *B01J 35/1042* (2013.01); *B01J 37/0009* (2013.01); *B01J 37/0201* (2013.01); *B01J 37/088* (2013.01); *B01J 37/10* (2013.01); *B01J 37/30* (2013.01); *C10G 47/20* (2013.01); *B01J 2029/081* (2013.01); *B01J 2229/16* (2013.01); *B01J 2229/18* (2013.01); *B01J 2229/186* (2013.01); *B01J 2229/20* (2013.01); *B01J 2229/37* (2013.01); *B01J 2229/38* (2013.01); *B01J 2229/42* (2013.01); *C10G 2300/70* (2013.01)

(58) Field of Classification Search
CPC .... B01J 29/08; B01J 29/084; B01J 2029/081; B01J 29/146; B01J 29/16; B01J 29/166; B01J 2229/16; B01J 2229/186; B01J 2229/38; B01J 2229/18; B01J 2229/20; B01J 2229/32; B01J 2229/36; B01J 2229/37; B01J 2229/42; B01J 35/1023; B01J 35/1038; B01J 35/1042; B01J 35/0006; B01J 37/0009; B01J 37/088; B01J 37/0201; B01J 37/10; B01J 37/30; C10G 47/20; C10G 2300/70
USPC ................ 502/60, 63, 64, 66, 69, 74, 79, 86
See application file for complete search history.

(56) References Cited

U.S. PATENT DOCUMENTS

| | | |
|---|---|---|
| 4,036,739 A | 7/1977 | Ward |
| 4,503,023 A | 3/1985 | Breck et al. |

(Continued)

FOREIGN PATENT DOCUMENTS

| | | |
|---|---|---|
| CN | 1178193 A | 4/1998 |
| CN | 1178721 A | 4/1998 |

(Continued)

OTHER PUBLICATIONS

Gounder, Rajamani et al.; Solvation and acid strength effects on catalysis by faujasite zeolites, Journal of Catalysis, vol. 286, Dec. 14, 2011, pp. 214-223. DOI: 10.1016/j.jcat.2011.11.002.

*Primary Examiner* — Elizabeth D Wood
(74) *Attorney, Agent, or Firm* — Novick, Kim & Lee, PLLC; Allen Xue

(57) ABSTRACT

A modified Y-type molecular sieve contains 0.5-2 wt. % of $Na_2O$ based on the total amount of the modified Y-type molecular sieve. In the modified Y-type molecular sieve, the ratio between the total acid amount measured by pyridine and infrared spectrometry and total acid amount measured by n-butyl pyridine and infrared spectrometry is 1-1.2. The total acid amount measured by pyridine and infrared spectrometry of the modified Y-type molecular sieve is 0.1-1.2 mmol/g. The acid center sites of the molecular sieve of the modified Y-type molecular sieve are distributed in the large pore channels. The molecular sieve is used in the hydrocracking reaction process of a wax oil.

20 Claims, No Drawings

(51) Int. Cl.
    *B01J 37/00*     (2006.01)
    *B01J 37/02*     (2006.01)

(56) References Cited

U.S. PATENT DOCUMENTS

| | | | |
|---|---|---|---|
| 2011/0083999 A1 | 4/2011 | Simon | |
| 2011/0120910 A1 | 5/2011 | Simon et al. | |
| 2016/0229700 A1* | 8/2016 | Liu | B01J 37/0207 |
| 2016/0347683 A1* | 12/2016 | Aranda | C07C 2/66 |
| 2017/0128919 A1* | 5/2017 | Liu | B01J 37/0201 |

FOREIGN PATENT DOCUMENTS

| | | |
|---|---|---|
| CN | 1951814 A | 4/2007 |
| CN | 103447069 A | 12/2013 |
| CN | 106669786 A | 5/2017 |
| CN | 107304373 A | 10/2017 |
| EP | 2488609 B1 | 12/2014 |
| JP | 2010163349 A | 7/2010 |
| RU | 2310509 C1 | 11/2007 |

* cited by examiner

MODIFIED Y-TYPE MOLECULAR SIEVE AND PREPARATION METHOD THEREOF, HYDROCRACKING CATALYST AND PREPARATION METHOD THEREOF, AND METHOD FOR HYDROCRACKING HYDROCARBON OIL

FIELD

The present disclosure relates to the technical field of hydrocracking, in particular to a modified Y-type molecular sieve and process for preparing same, a hydrocracking catalyst and preparation method thereof, and a method for hydrocracking a hydrocarbon oil.

BACKGROUND

The hydrocracking technology has the characteristics such as strong adaptability of raw materials, high flexibility of product program, high selectivity of target products, desirable product quality and high added value, the technology can be used for directly converting a variety of heavy and inferior raw materials into clean fuel oil and high-quality chemical raw materials, it has emerged as one of the most important deep processing technologies for heavy oil in the modem petroleum refining and petrochemical industry, and has been increasingly and widely used in China and foreign countries. Although the existing processing capacity of hydrocracking plant installations in China has exceeded 50.0 Mt/a, the hydrocracking technology will be further widely used, while the hydrocracking technology per se faces with stringent requirements, as the domestic crude oil quality deteriorates gradually, the imported amount of high-sulfur crude oil has increased significantly, the environmental protection requirements for the petroleum refining process and oil products are gradually rigid, and the market demand for clean fuel oils and chemical raw materials is ever-increasing.

The core of the hydrocracking technology is the hydrocracking catalyst, which is a bifunctional catalyst with cracking and hydrogenation activity. The cracking function is provided by an acidic carrier material such as molecular sieve, and the hydrogenation function is supplied by the active metals in the Group VI and Group VIII in the periodic table of elements carried on the catalyst, the different reaction requirements are met through the modulation of the cracking and hydrogenation bifunctional sites. The molecular sieve is the cracking component of the hydrocracking catalyst, and the properties of molecular sieve play a decisive role in the reaction performance of the catalyst. At present, the types of molecular sieves used in hydrocracking catalysts mainly include Y-type and β-type. The Y-type molecular sieve has 12-membered ring macro-pores with three-dimensional super-cage and tetrahedral orientation and open pore channel structure, it has excellent selectivity of ring opening for macromolecular cyclic hydrocarbons, and the heavy naphtha product has high aromatic hydrocarbon potential content, and the hydrogenation tail oil has a low BMCI value (Bureau of Mines Correlation Index from USA, it is an index measuring content of aromatic hydrocarbons), thus the Y-type molecular sieve is currently the most widely used in the hydrocracking catalysts.

The Y-type molecular sieve is used as cracking component of hydrocracking catalyst, it is usually subjected to modification treatment before use, so as to enhance the hydrothermal and chemical stability of the molecular sieve, and improve the acid properties and pore structure to obtain suitable acidic environment and the ideal pore structure for hydrocracking reactions. Generally, the modification technologies of the Y-type molecular sieves comprise a hydrothermal modification method, a chemical dealuminization modification method such as an inorganic acid, an organic acid, a salt and a complexing agent, and a combination of the hydrothermal modification method and the chemical dealuminization modification method. However, the modified Y-type molecular sieve obtained by using the current modification method has its acid centers distributed in different pore channels (e.g., micropores and secondary pores) of the molecular sieve, on the one hand, the acid centers in the micropores have poor usability, on the other hand, they are prone to cause an occurrence of excessive secondary cracking reaction, thereby reduce the reaction selectivity and the yield of liquid products.

U.S. Pat. No. 4,503,023 discloses a method for modifying molecular sieves, which uses NaY zeolite to carry out liquid phase dealuminization and silicon supplementation with ammonium fluorosilicate, and the prepared molecular sieve has high crystallinity and high silica-alumina ratio, and shows certain resistance to organic nitrogen poisoning; however, given that the structure is excessively complete, there are few secondary pores, and the acid centers are mainly located at the micropores, thus the modified molecular sieve has poor accessibility for the macromolecular reactants in the inferior raw materials.

CN1178193A discloses a modified Y zeolite having a content of 45% or more of the pore volume with a pore diameter greater than $1.7 \times 10^{-10}$ m, a surface area of 750-900 $m^2/g$, a lattice parameter of $24.23 \times 10^{-10}$ in to $25.45 \times 10^{-10}$ in, a crystallinity within a range of 95-110%, and the $SiO_2/Al_2O_3$ ratio within a range of 7-20. The method comprises the following steps: using NaY zeolite as a raw material, initially performing ammonium exchange such that the $Na_2O$ content is less than 2 m %, and then processing it with water vapor, it is characterized in that the water vapor-processed zeolite is further treated with a buffer solution containing $NH_4^+$, $H^+$ and other metal cations. The Y molecular sieves subject to modification treatment by means of a combination of hydrothermal desulfurization and buffer solution treatment, the obtained molecular sieve has relatively rich secondary pores and desirable diffusion performance. However, the modified Y molecular sieve produced with the modification method still has a large amount of acid sites in the microporous structure, the acid sites in the molecular sieves have a large dispersity and poor reaction selectivity.

CN1178721A discloses a high silica-alumina ratio and high crystallinity Y type molecular sieve, it is characterized in that the molecular sieve has a lattice constant of 2.425-2.436 nm, a $SiO_2/Al_2O_3$ molar ratio of 15-200, a specific surface of 700-780 $m^2/g$, and a relative crystallinity of 100-125%. The preparation method comprises the following steps: the $NH_4NaY$ molecular sieve raw material is subject to dealuminization and silicon supplementation with ammonium fluorosilicate, and then subjecting to hydrothermal treatment with saturated water vapor, and finally treated it with an aluminum salt solution. However, the obtained modified Y-type molecular sieve has a lower content of secondary pores, and a large number of acid centers are distributed in the micropores, resulting in an occurrence of excessive cracking reaction in the reaction process and the reduced yield of liquid products.

U.S. Pat. No. 4,036,739 discloses a hydrocracking process, wherein a modification method of a Y-type molecular sieve is disclosed as follows: the Y-type molecular sieve is treated at a temperature of 315-899° C. and contacted with water vapor having a pressure of at least 0.5 psi of water vapor for a period of time, so as to prepare a modified Y molecular sieve having a lattice constant of 2.440-2.464 nm; the treated Y molecular sieve is subjected to ammonium exchange to obtain an intermediate having a sodium content less than 1%; and a modified Y molecular sieve having a lattice constant less than 2.440 nm is then obtained. However, since the treatment process is relatively stringent, the crystallinity of the produced modified Y molecular sieve is severely deteriorated, and the crystallinity is low, which affects the performance of the modified Y molecular sieve in use.

The Y-type molecular sieve provided by the prior art has defects that the cracking in the hydrocracking reaction is excessive, and the reaction selectivity is poor.

SUMMARY

A purpose of the present disclosure is to overcome the defects in the prior art in regard to excessive cracking in the hydrocracking reaction and poor reaction selectivity, and to provide a modified Y-type molecular sieve and process for preparing same, a hydrocracking catalyst and preparation method thereof, and a method for hydrocracking a hydrocarbon oil. The acid center sites of the molecular sieve of the modified Y-type molecular sieve are intensively distributed in the large pore channel, the produced hydrocracking catalyst used in the hydrocracking reaction process of wax oil may enhance selectivity of the catalytic reaction process, reduce the occurrence of secondary cracking reaction, improve quality of hydrocracking tail oil, and increase yield of the reaction liquid products.

It was discovered by the inventors of the present disclosure in the researches that in the modified Y-type molecular sieve prepared by the prior art, a large number of acid centers exist in the microporous structure, the ratio between total amount of pyridine infrared acid and the n-butyl pyridine infrared acid is generally greater than 1.5. However, the presence of a large amount of the acid centers in the micropores causes an occurrence of excessive cracking reaction and the deteriorated reaction selectivity. In order to solve the problem, the inventors have proposed in the present disclosure to limit distribution of the acid centers on the modified Y-type molecular sieves and control the number of acid centers in the micropores so as to solve the problem concerning excessive cracking of the hydrocracking reaction and poor reaction selectivity.

In response to the deficiencies in the prior art, in a first aspect, the present disclosure provides a modified Y-type molecular sieve, wherein the modified Y-type molecular sieve contains 0.5-2 wt. % of $Na_2O$ based on the total amount of the modified Y-type molecular sieve; the ratio between the total acid amount measured by pyridine and infrared spectrometry of the modified Y-type molecular sieve and total acid amount measured by n-butyl pyridine and infrared spectrometry of the modified Y-type molecular sieve is 1-1.2; the total acid amount measured by pyridine and infrared spectrometry of the modified Y-type molecular sieve is 0.1-1.2 mmol/g.

Preferably, the modified Y-type molecular sieve has a specific surface area of 500-900 m²/g, the modified Y-type molecular sieve has a pore volume of 0.28-0.7 ml/g, the modified Y-type molecular sieve has a relative crystallinity of 50%-130%; the modified Y-type molecular sieve has a lattice parameter of 2.425-2.450, and the modified Y-type molecular sieve has a silica-alumina molar ratio within a range of (6-80):1.

In a second aspect, the present disclosure provides a method for preparing the modified Y-type molecular sieve of the present disclosure, comprising the following steps:
(1) pretreating the NaY molecular sieve to obtain a desodiumized and dealuminated Y-type molecular sieve;
(2) subjecting the desodiumized and dealuminated Y-type molecular sieve to sodium ion exchange to obtain a sodium-containing Y-type molecular sieve;
(3) subjecting the sodium-containing Y-type molecular sieve and the macromolecular ammonium salt solution to immersion treatment, and then subjecting to drying and calcination to prepare a modified Y-type molecular sieve.

Preferably, the pretreatment process in step (1) comprises one of ammonium ion exchange, hydrothermal dealumination, aluminum salt dealumination, fluorosilicate dealumination and acid dealumination or a combination thereof.

Preferably, the pretreatment process in step (1) comprises the following steps:
(a) subjecting the NaY molecular sieve and an ammonium salt aqueous solution to an ammonium ion exchange reaction to obtain a desodiumized Y-type molecular sieve;
(b) hydrothermally dealuminating the desodiumized Y-type molecular sieve to obtain a hydrothermally dealuminized product;
(c) subjecting the hydrothermally dealuminized product to a chemical dealumination so as to prepare the desodiumized and dealuminated Y-type molecular sieve, wherein the chemical dealumination is aluminum salt dealumination, fluorosilicate dealumination or acid dealumination.

In a third aspect, the present disclosure provides a method for preparing a hydrocracking catalyst, comprising the following steps:
(I) mixing the modified Y-type molecular sieve of the present disclosure, amorphous silicon aluminum and/or alumina into a carrier mixture by a weight ratio of (5-90):(0-50):(0.6-80), then adding an aqueous nitric acid solution having a mass fraction of 3-30 wt. % into the carrier mixture to form a slurry for performing bar extrusion molding;
(II) drying the bar extrusion product obtained in step (I) at a temperature of 80-120° C. for 1-5 h, and subsequently calcining the dried product at a temperature of 400-500° C. for 1-5 h to obtain a silica-alumina carrier;
(III) subjecting the silica-alumina carrier to a saturated immersion in a solution containing a hydrogenation active metal, and drying and calcining the obtained product to prepare a hydrocracking catalyst.

In a fourth aspect, the present disclosure provides a hydrocracking catalyst prepared with the method of the present disclosure, comprising a silica-alumina carrier and a hydrogenation active metal, based on the total amount of the hydrocracking catalyst, the content of the silica-alumina carrier is 55-85 wt. %, and the content of the hydrogenation active metal is 15-45 wt. % measured by the metal oxide, wherein the silica-alumina carrier contains the modified Y-type molecular sieve of the present disclosure, the content of the modified Y-type molecular sieve in the silica-alumina carrier is 5-90 wt. %.

In a fifth aspect, the present disclosure provides a method for hydrocracking a hydrocarbon oil, comprising: contacting a hydrocarbon oil with a hydrocracking catalyst of the present disclosure in the presence of hydrogen so as to carry out a hydrocracking reaction, wherein the reaction temperature is 340-420° C., the reaction pressure is 8-20 MPa, the volumetric space velocity of the hydrocarbon oil feedstock is 0.1-2 h$^{-1}$, and the volume ratio between the hydrogen and the hydrocarbon oil is within a range of (200-2000):1.

Through the aforementioned technical solution, the present disclosure provides a modified Y-type molecular sieve in which the acid center sites are intensively distributed in a large pore channel (i.e., a secondary pore). The acid center sites in the micropores of the modified Y-type molecular sieve are basically occupied by sodium ions, merely leaving the acid centers in the large pore channels, thus the occurrence of secondary cracking reaction resulting from an entering of hydrocarbon molecules into the micropores may be reduced. The total acid amount measured by near infrared spectroscopy in the modified Y-type molecular sieve is determined by using basic organic compounds with different molecular sizes, such as pyridine and n-butylpyridine, when the acid amounts measured by the two compounds are comparative, it demonstrates that the acid centers of the modified Y-type molecular sieve is intensively distributed in the large pore channel.

The present disclosure provides a method for preparing a modified Y-type molecular sieve, which comprises the following steps: initially subjecting the acid centers of the modified Y-type molecular sieve to the sodium ion exchange, such that the acid center sites in various pore channels of the Y-type molecular sieve are occupied by sodium ions; then selecting the benzyl quaternary ammonium salt with a larger molecular size to perform the modified Y-type molecular sieve with ammonium ion exchange treatment; since the benzyl quaternary ammonium salt has a larger molecular size, the sodium ions distributed in the large pore channels are selectively exchanged into the benzyl quaternary ammonium cations; after the drying and calcination process, only the benzyl quaternary ammonium cations are removed to expose the acid center sites in the large pore channels of the Y-type molecular sieve, while the acid center sites in the micropores are still occupied by the sodium ions so that the acidity is not shown; therefore, the molecular sieve provided by the present disclosure has the characteristic that the acid center sites are intensively distributed in the large pore channels, and the characteristics can be identified by measuring the acidity by infrared spectrometry with pyridine and n-butylpyridine having different molecular sizes respectively, thereby obtain the modified Y-type molecular sieve with the aforementioned characteristics.

The modified Y-type molecular sieve of the present disclosure is further used for preparing the hydrocracking catalyst, the hydrocracking catalyst may be applied in the hydrocracking reaction process of the wax oil, it is beneficial to enhancing the reaction selectivity of the macromolecular cyclic hydrocarbons in wax oil, reducing the occurrence of secondary cracking reaction, improving quality of hydrocracking tail oil, and increasing yield of the reaction liquid products.

DETAILED DESCRIPTIONS

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to yield one or more new numerical ranges, which should be considered as specifically disclosed herein.

In a first aspect, the present disclosure provides a modified Y-type molecular sieve, wherein the modified Y-type molecular sieve contains 0.5-2 wt. % of $Na_2O$ based on the total amount of the modified Y-type molecular sieve; the ratio between the total acid amount measured by pyridine and infrared spectrometry of the modified Y-type molecular sieve and total acid amount measured by n-butyl pyridine and infrared spectrometry of the modified Y-type molecular sieve is 1-1.2; the total acid amount measured by pyridine and infrared spectrometry of the modified Y-type molecular sieve is 0.1-1.2 mmol/g.

In the present disclosure, the modified Y-type molecular sieve refers to a molecular sieve obtained by subjecting the Y-type molecular sieve raw powder to chemical treatment (such as the method provided subsequently in the present disclosure).

The modified Y-type molecular sieve provided by the present disclosure has the acid centers mainly distributed in the large pore channels, and a small amount of acid center or even none of the acid center is distributed in the micropores, the arrangement can reduce the hydrocarbon oil molecules entering into the micropores and performing the secondary cracking reaction at the acid center.

The characteristic of the acid center distribution in the above-mentioned pore channels of the modified Y-type molecular sieve provided by the present disclosure can be embodied by the results of acid measurement of the modified Y-type molecular sieve by using pyridine and n-butylpyridine as two kinds of probe molecules, respectively. The n-butylpyridine has a molecular diameter of about 0.8 nm, it merely can enter the large pore channels of the modified Y-type molecular sieve provided by the present disclosure, reflecting the total amount of acid centers in the large pore channels. The pyridine has a molecular diameter of about 0.6 nm and can enter both the micropores and large pore channels of the modified Y-type molecular sieve, reflecting the total amount of acid centers in all the pore channels of the modified Y-type molecular sieve. The specific test process can be as follows: the test process is performed with adsorption with pyridine and n-butylpyridine and the infrared spectroscopy, using Nicolet 6700 Fourier infrared spectrometer of the NICOLET Corporation of the United States of America (USA), take 20 mg of the pulverized sample (with particle size less than 200 mesh) and compress it into a slice with a diameter of 20 mm, and place it on the sample holder of the absorption cell; take 200 mg of the sample (in sheet-shape) and mount it into the hanging cup at the lower end of the quartz spring (record the length of spring $x_1$ in unit of mm before adding the sample), connect the absorption cell and the adsorption tube firmly, and start to perform evacuation and purification; when the vacuum degree reaches $4 \times 10^{-2}$ Pa, the temperature is raised to 500° C. and maintain the temperature for 1 h in order to remove the surface adsorbate of the sample (at this time, record the length of the spring $x_2$ in unit of mm after the sample is cleaned). Then, it is cooled to the room temperature, and pyridine (or n-butylpyridine) is adsorbed till saturation, and subsequently raises temperature to 160° C., and keeps an equilibrated status for 1 hour to desorb the physically adsorbed pyridine (in the meanwhile, record the length of the spring $x_3$ in unit of mm after adsorption of pyridine), calculates the total acid amount by means of the pyridine (or n-butylpyridine) weight adsorption method.

Wherein, the total acid amount is calculated by the pyridine weight adsorption method, the specific content is as follows:

Hooke's law (the relationship between the spring elongation length versus force):

$$f=k\Delta x$$

When the spring is placed vertically: $m=k\Delta x$

Wherein, in is the mass of sample in unit of grain (g); $\Delta x$ is the elongation length of the spring in unit of millimeter (mm); k is the stiffness coefficient of the spring.

$$\frac{\text{mass of adsorbed pyridine}/79.1}{\text{total acid amount}} = \frac{\text{mass of sample}}{1 \text{ gram}}$$

The total acid amount C measured by pyridine and infrared spectrometry (unit: mmol/g):

$$C = \frac{k(x_3-x_2)}{k(x_2-x_1)\times 79.1}\text{mol/g} = \frac{x_3-x_2}{x_2-x_1}\times\frac{1}{79.1}\text{mol/g} = 12.64\times\frac{x_3-x_2}{x_2-x_1}\text{mmol/g}$$

The total acid amount C' measured by n-butyl pyridine and infrared spectrometry (unit: mmol/g): it is obtained by calculation according to the above formula, except for the number 79.1 is replaced by 136.1;

Note: 79.1 and 136.1 are the molar masses of pyridine and n-butyl pyridine, respectively, and the unit is g/mol.

The present disclosure adjusts the concentrated distribution of the acid center sites in the micropores and large pore channels of the Y-type molecular sieve, thereby control reaction of the hydrocarbon oil molecules on the molecular sieve. The distribution of the acid center sites is reflected by the total acid amount measured by infrared spectrometry and pyridine and the total acid amount measured by infrared spectrometry and n-butyl pyridine, respectively. As for a conventional Y-type molecular sieve that has not been adjusted in the acid center site of the pore channels, the ratio between the total acid amount measured by pyridine and infrared spectrometry of the modified Y-type molecular sieve and total acid amount measured by n-butyl pyridine and infrared spectrometry of the modified Y-type molecular sieve will be greater than 1.2. This makes it possible to distinguish whether or not the acid center sites in the micropores of the Y-type molecular sieve are controlled.

When total acid amount measured by n-butyl pyridine and infrared spectrometry of the modified Y-type molecular sieve and the total acid amount measured by pyridine and infrared spectrometry of the modified Y-type molecular sieve are roughly equivalent, or the former is slightly smaller than the latter, that is, as defined above, when the ratio between the total acid amount measured by pyridine and infrared spectrometry of the modified Y-type molecular sieve and total acid amount measured by n-butyl pyridine and infrared spectrometry of the modified Y-type molecular sieve is 1-1.2, it indicates that the acid centers contained in the modified Y-type molecular sieve is mainly concentrated in the large pore channels.

According to the present disclosure, preferably, the modified Y-type molecular sieve contains 0.8-1.8 wt. % of $Na_2O$ based on the total amount of the modified Y-type molecular sieve; the ratio between the total acid amount measured by pyridine and infrared spectrometry of the modified Y-type molecular sieve and total acid amount measured by n-butyl pyridine and infrared spectrometry of the modified Y-type molecular sieve is 1.02-1.15.

More preferably, the modified Y-type molecular sieve contains 1-1.5 wt. % of $Na_2O$ based on the total amount of the modified Y-type molecular sieve; the ratio between the total acid amount measured by pyridine and infrared spectrometry of the modified Y-type molecular sieve and total acid amount measured by n-butyl pyridine and infrared spectrometry of the modified Y-type molecular sieve is 1.05-1.12.

According to the present disclosure, the total acid amount measured by pyridine and infrared spectrometry of the modified Y-type molecular sieve is preferably 0.1-1.2 mmol/g.

More preferably, the total acid amount measured by pyridine and infrared spectrometry of the modified Y-type molecular sieve is 0.3-0.8 mmol/g.

According to the present disclosure, the modified Y-type molecular sieve has other characteristics, which are also beneficial for use in the hydrocracking reaction process of wax oil, improving quality of the hydrocracking tail oil, and improving yield of the reaction liquid products. In a preferable circumstance, the modified Y-type molecular sieve has a specific surface area of 500-900 $m^2/g$; preferably 550-850 $m^2/g$; more preferably 600-750 $m^2/g$.

Preferably, the modified Y-type molecular sieve has a pore volume of 0.28-0.7 mL/g; preferably 0.3-0.65 mL/g; more preferably 0.35-0.6 mL/g.

Preferably, the modified Y-type molecular sieve has a relative crystallinity of 50%-130%; 60%-110%; more preferably 70%-100%.

Preferably, the modified Y-type molecular sieve has a lattice parameter of 2.425-2.45 nm; preferably 2.428-2.448 nm; more preferably 2.43-2.445 nm.

Preferably, the modified Y-type molecular sieve has a silica-alumina molar ratio within a range of (6-80):1; preferably (8-60):1; more preferably (10-50):1.

In a second aspect, the present disclosure provides a method for preparing a modified Y-type molecular sieve of the present disclosure, comprising the following steps:

(1) pretreating the NaY molecular sieve to obtain a desodiumized and dealuminated Y-type molecular sieve;

(2) subjecting the desodiumized and dealuminated Y-type molecular sieve to sodium ion exchange to obtain a sodium-containing Y-type molecular sieve;

(3) subjecting the sodium-containing Y-type molecular sieve and the macromolecular ammonium salt solution to immersion treatment, and then subjecting to drying and calcination to prepare a modified Y-type molecular sieve.

According to the present disclosure, step (1) is used to form large pore channels in the NaY molecular sieve, which facilitates subsequent modification of the large pore channels and the small pore channels, respectively. Preferably, the pretreatment process in step (1) comprises one of ammonium ion exchange, hydrothermal dealumination, aluminum salt dealumination, fluorosilicate dealumination and acid dealumination or a combination thereof. In the present disclosure, subjecting the NaY molecular sieve to the pretreatment may be one or more steps of subjecting the NaY molecular sieve to ammonium ion exchange, hydrothermal dealumination, aluminum salt dealumination, fluorosilicate dealumination and acid dealumination, the sequence between the steps is not defined as long as the desodiumized and dealuminated Y-type molecular sieve can be provided. For example, the desodiumized and dealuminated Y-type molecular sieve has a $Na_2O$ content less than 3 wt. %, a $SiO_2/Al_2O_3$ molar ratio within a range of (6-80):1, and a lattice constant of 2.425-2.45. Generally, the NaY molecular sieve is initially desodiumized by the ammonium ion exchange, the desodiumized product is then subjected to dealumination, one of hydrothermal dealumination, aluminum salt dealumination, fluorosilicate dealumination and acid dealumination or a combination thereof may be selected.

According to a preferred embodiment of the present disclosure, the pretreatment process in step (1) comprises the following steps:

(a) subjecting the NaY molecular sieve and an ammonium salt aqueous solution to an ammonium ion exchange reaction to obtain a desodiumized Y-type molecular sieve;

(b) hydrothermally dealuminating the desodiumized Y-type molecular sieve to obtain a hydrothermally dealuminized product;

(c) subjecting the hydrothermally dealuminized product to a chemical dealumination so as to prepare the desodiumized and dealuminated Y-type molecular sieve, wherein the chemical dealumination is aluminum salt dealumination, fluorosilicate dealumination or acid dealumination.

According to the present disclosure, step (a) is used to remove Na ions from the NaY molecular sieve such that the subsequent dealumination process may proceeds smoothly. Preferably, the ammonium salt ion exchange reaction in step (a) is as follows: carrying out exchanging process of the NaY molecular sieve with the ammonium salt aqueous solution at a temperature 60-120° C., preferably 60-90° C. for 1-3 h, and the number of exchanging process is 1-4 times, thereby obtain the desodiumized Y-type molecular sieve.

Preferably, the desodiumized Y-type molecular sieve has a $Na_2O$ content less than 3 wt. %.

Preferably, the NaY molecular sieve has a $SiO_2/Al_2O_3$ molar ratio within a range of (3-6):1 and a $Na_2O$ content 6-12 wt. %.

Preferably, the ammonium salt is one or more selected from the group consisting of ammonium chloride, ammonium nitrate, ammonium sulfate, ammonium acetate and ammonium oxalate, and the molar concentration of the aqueous solution of ammonium salt is 0.3-6 mol/L, preferably 1-3 mol/L.

According to the present disclosure, step (b) is used for dealuminization of the desodiumized Y-type molecular sieve to form large pore channels. Preferably, the hydrothermal dealuminization process in step (b) is as follows: contacting the desodiumized Y-type molecular sieve with water vapor at a temperature of 520-700° C. and a pressure of 0.01-0.5 MPa for 1-6 h.

Preferably, the number of hydrothermal dealumination is 1-3 times.

According to the present disclosure, step (c) is used for chemical dealumination of molecular sieves to form large pore channels. Preferably, the chemical dealuminization process in step (c) is as follows: the hydrothermal dealuminization product is subjected to a constant temperature reaction with an aluminum salt solution, an ammonium fluorosilicate solution or a nitric acid solution at a temperature of 50-120° C. for 0.5-3 h.

Preferably, the aluminum salt solution is an aqueous solution of at least one of aluminum chloride, aluminum sulfate and aluminum nitrate.

Preferably, the molar concentration of the aluminum salt solution, the ammonium fluorosilicate solution or the nitric acid solution is within a range of 0.05-2 mol/L. The aluminum salt dealumination exactly refers to when the hydrothermally dealuminated product is subjected to the constant temperature reaction with the aluminum salt solution. The fluorosilicate dealumination exactly refers to when the hydrothermally dealuminated product is subjected to the constant temperature reaction with the ammonium fluorosilicate solution. The acid dealumination exactly refers to when the hydrothermally dealuminated product is subjected to the constant temperature reaction with the nitric acid solution.

According to the present disclosure, the step (2) is used for neutralizing the acid centers vacated in the large pore channels and micropore channels of the desodiumized and dealuminized Y-type molecular sieve with sodium ions. The sodium ion exchange process in step (2) is as follows: the desodiumized and dealuminating Y-type molecular sieve is subjected to the constant temperature reaction with the aqueous solution of $NaNO_3$ at a temperature of 40-80° C. for 1-4 h; wherein the mass fraction of $NaNO_3$ in the aqueous solution of $NaNO_3$ is 0.1-3 wt. %.

According to the present disclosure, the immersion treatment in step (3) is carried out by using a macromolecular ammonium salt for exchanging sodium ions occupying the acid centers in the large pore channels of the Y-type molecular sieve, such that the acid centers in the large pore channels are presented. However, the macromolecular ammonium salt cannot enter the micropore channel of the Y-type molecular sieve, and the sodium ions may still occupy the acid centers in the micropore channel. The finally obtained modified Y-type molecular sieve of the present disclosure can provide large pore channels having acid centers, but there are few or even no acid center in the micropore channels; when the Y-type molecular sieve is applied in the hydrocracking reaction, it may reduce the secondary cracking reaction of the hydrocarbon oil. Preferably, the immersion treatment in step (3) is as follows: immersing the sodium-containing Y-type molecular sieve in the macromolecular ammonium salt solution at a temperature of 40-80° C. for 2-6 h.

In the present disclosure, the macromolecular ammonium salt is preferably a benzyl quaternary ammonium salt.

Preferably, the benzyl quaternary ammonium salt is at least one of benzyl tripropyl ammonium bromide, benzyl tributyl ammonium bromide, benzyl tripropyl ammonium chloride and benzyl tributyl ammonium chloride.

Preferably, the macromolecular ammonium salt solution has a molar concentration of 0.2-2 mol/L measured based on the concentration of the bromine or chlorine element.

In the present disclosure, the distribution of acid centers in the prepared modified Y-type molecular sieve can be measured by method of pyridine adsorption and infrared spectrometry and the method of n-butyl pyridine adsorption and infrared spectrometry. The specific methods and test results are as previously described and will not be repeated here.

According to the present disclosure, preferably, the drying process in step (3) is carried out by drying at a temperature of 100-150° C. for 1-4 h; the calcination process is carried out by calcining at a temperature of 500-700° C. for 2-6 h.

In a third aspect, the present disclosure provides a method of preparing a hydrocracking catalyst, comprising the following steps:

(I) mixing the modified Y-type molecular sieve of the present disclosure, amorphous silicon aluminum and/or alumina into a carrier mixture by a weight ratio of (5-90):(0-50):(0.6-80), then adding an aqueous nitric acid solution having a mass fraction of 3-30 wt. % into the carrier mixture to form a slurry for performing bar extrusion molding;

(II) drying the bar extrusion product obtained in step (I) at a temperature of 80-120° C. for 1-5 h, and subsequently calcining the dried product at a temperature of 400-500° C. for 1-5 h to obtain a silica-alumina carrier;

(III) subjecting the silica-alumina carrier to a saturated immersion in a solution containing a hydrogenation active metal, and drying and calcining the obtained product to prepare a hydrocracking catalyst.

In step (I) of the method for preparing a catalyst provided by the present disclosure, the solid content of the slurry is suitable for bar extrusion molding to obtain a bar-shaped extrusion product. Preferably, the slurry has a solid content of 30-60 wt. %.

In the present disclosure, the amount of the solution containing the hydrogenation-active metal added to the step (III) shall meet the requirement that the prepared hydrocracking catalyst contains the hydrogenation-active metal in an amount of 15-45 wt. % measured based on the metal oxide. In the solution containing a hydrogenation-active metal, the concentration of the hydrogenation-active metal measured based on metal oxide may be 20-70 mol/L.

In the present disclosure, the solution containing a hydrogenation-active metal may be a solution of compounds containing metal element(s) of Group VIII and/or Group VI. Preferably, it may be a solution of compounds containing Nickel (Ni) and/or Cobalt (Co), a solution of compounds containing Tungsten (W) and/or Molybdenum (Mo). More preferably, the solution containing a hydrogenation active metal may be a solution containing nickel nitrate, cobalt nitrate, ammonium metatungstate, ammonium molybdate, or molybdenum oxide.

In the present disclosure, the drying process of step (III) may be carried out at a temperature of 90-150° C. for 2-20 h. The calcination process can be implemented at a temperature of 400-600° C. for 2-10 h. As a result, the hydrogenation-active metal is converted into an oxide form and presents in the hydrocracking catalyst.

In a fourth aspect, the present disclosure provides a hydrocracking catalyst prepared with the method of the present disclosure, comprising a silica-alumina carrier and a hydrogenation active metal, based on the total amount of the hydrocracking catalyst, the content of the silica-alumina carrier is 55-85 wt. %, and the content of the hydrogenation active metal is 15-45 wt. % measured by the metal oxide, wherein the silica-alumina carrier contains the modified Y-type molecular sieve of the present disclosure, the content of the modified Y-type molecular sieve in the silica-alumina carrier is 5-90 wt. %.

According to the present disclosure, the hydrogenation-active metal is preferably a metal selected from the group VIII and/or Group VI.

Preferably, the Group VIII metal is Ni and/or Co, the Group VI metal is W and/or Mo.

Preferably, the hydrocracking catalyst contains, measured by the metal oxide, 3-15 wt. % of the Group VIII metal and 10-40 wt. % of the Group VI metal, based on the total amount of the catalyst.

In the present disclosure, in order to facilitate the use, transportation and storage of the hydrocracking catalyst, the hydrogenation active metal in the hydrocracking catalyst exists in an oxidation state, and may contact with a sulfur-containing compound before the hydrocracking reaction so as to convert into a sulfuration state by the sulfuration reaction, it participates in the hydrocracking of the hydrocarbon oil.

In the present disclosure, the hydrocracking catalyst comprises the modified Y-type molecular sieve component provided by the present disclosure, which may have favorable hydrocracking reaction selectivity, reduce secondary cracking reaction of hydrocarbon oil molecules, and improve selectivity of the hydrocracking reaction product. The reaction performance of the hydrocracking catalyst can be measured by means of the specific reaction performance evaluation experiment. The experiment may be performed on a small scale micro-reactor device in a single-stage, serial and one-pass technological process. The device is provided with two reactors connected in series. Along the process sequence, the first reactor is charged with a conventional refining catalyst, and the second reactor is charged with a hydrocracking catalyst.

In the present disclosure, the reaction evaluation can be separately performed by initially charging the second reactor with the hydrocracking catalyst of the present disclosure for a time and subsequently charging the second reactor with the hydrocracking catalyst prepared with the conventional Y-type molecular sieve, so as to compare the BMCI value of the cracked tail oil products and the yield of liquid products of the device obtained respectively from the two reactions on a condition of controlling the same nitrogen content of the refined oil and the conversion depth. Among them, the lower is the BMCI value of the tail oil product and the higher is the yield of the liquid products, it demonstrates that the corresponding catalyst is more efficient during the hydrocracking reaction, thereby promoting the reaction of the macromolecular cyclic hydrocarbon and reducing occurrence of the secondary cracking reaction. The difference between the two reactions merely resides in that the molecular sieves used in the catalysts are different. The aforementioned favorable results can be attributed to the fact that the acid centers of the molecular sieves are more concentrated in the large pore channels.

In a fifth aspect, the present disclosure provides a method for hydrocracking a hydrocarbon oil, comprising: contacting a hydrocarbon oil with a hydrocracking catalyst of the present disclosure in the presence of hydrogen so as to carry out a hydrocracking reaction, wherein the reaction temperature is 340-420° C., the reaction pressure is 8-20 MPa, the volumetric space velocity of the hydrocarbon oil feedstock is $0.1-2\ h^{-1}$, and the volume ratio between the hydrogen and the hydrocarbon oil is within a range of (200-2000):1.

In the present disclosure, the hydrocarbon oil may be a petroleum-based vacuum wax oil raw material having a distillation range of 300-600° C. and a density of 0.86-0.94 $g/cm^3$.

When the hydrocracking reaction is carried out, the hydrogenation-active metal in the hydrocracking catalyst participates the reaction in the form of a sulfuration state. However, if a catalyst containing a hydrogenation-active metal in a sulfuration state is directly prepared, the catalyst can be easily oxidized during the transportation and storage process, and the sulfuration of the hydrogenation-active metal is still required before the catalyst is formally involved in the hydrocracking reaction. Therefore, it is common practice in the art to make a choice to prepare a catalyst containing a hydrogenation-active metal in an oxidation state, and then the catalyst is subjected to a sulfuration reaction before the hydrocracking reaction of the hydrocarbon oil, so as to obtain a catalyst containing a hydrogenation-active metal in a sulfuration state, or to perform sulfuration of the hydrogenation-active metal and hydrocracking of hydrocarbon oil during a process of contacting the hydrocarbon oil with the catalyst by using the sulfur-containing compound in the hydrocarbon oil. In the method for hydrocracking a hydrocarbon oil provided by the present disclosure, the hydrocracking catalyst of the present disclosure allows the hydrogenation-active metal to be converted into a sulfuration state in a presence of a sulfur-containing compound in the hydrocarbon oil and implement hydrocracking of the hydrocarbon oil during the hydrocracking reaction process.

The present disclosure will be described in details below by means of the examples.

In the following examples and comparative examples, the total acid amount of pyridine is measured by pyridine adsorption method and infrared spectrometry, and the total acid amount of n-butyl pyridine is measured by n-butyl pyridine adsorption method and infrared spectrometry, with the Nicolet 6700 Fourier infrared spectrometry of the NICOLET Corporation of the United States of America (USA), and the process is as follows:

take 20 mg of the pulverized sample (with particle size less than 200 mesh) and compress it into a slice with a diameter of 20 mm, and place it on the sample holder of the absorption cell; take 200 mg of the sample (in sheet-shape) and mount it into the hanging cup at the lower end of the quartz spring (record the length of spring $x_1$ in unit of mm before adding the sample), connect the absorption cell and the adsorption tube firmly, and start to perform evacuation and purification; when the vacuum degree reaches $4 \times 10^{-2}$ Pa, the temperature is raised to 500° C. and maintain the temperature for 1 h in order to remove the surface adsorbate of the sample (at this time, record the length of the spring $x_2$ in unit of mm after the sample is cleaned). Then, it is cooled to the room temperature, and pyridine (or n-butylpyridine) is adsorbed till saturation, and subsequently raises temperature to 160° C., and keeps an equilibrated status for 1 hour to desorb the physically adsorbed pyridine (in the meanwhile, record the length of the spring $x_3$ in unit of mm after adsorption of pyridine), calculates the total acid amount by means of the pyridine (or n-butylpyridine) weight adsorption method.

Wherein, the total acid amount is calculated by the pyridine weight adsorption method, the specific content is as follows:

Hooke's law (the relationship between the spring elongation length versus force):

$$f = k\Delta x$$

When the spring is placed vertically: $m = k\Delta x$

Wherein, in is the mass of sample in unit of grain (g); $\Delta x$ is the elongation length of the spring in unit of millimeter (mm); k is the stiffness coefficient of the spring.

$$\frac{\text{mass of adsorbed pyridine}/79.1}{\text{total acid amount}} = \frac{\text{mass of sample}}{1 \text{ gram}}$$

The total acid amount C measured by pyridine and infrared spectrometry (unit: mmol/g):

$$C = \frac{k(x_3 - x_2)}{k(x_2 - x_1) \times 79.1} \text{ mol/g} = \frac{x_3 - x_2}{x_2 - x_1} \times \frac{1}{79.1} \text{ mol/g} = 12.64 \times \frac{x_3 - x_2}{x_2 - x_1} \text{ mmol/g}$$

The total acid amount C' measured by n-butyl pyridine and infrared spectrometry (unit: mmol/g): it is obtained by calculation according to the above formula, except for the number 79.1 is replaced by 136.1;

Note: 79.1 and 136.1 refer to molar mass of pyridine and n-butyl pyridine with the unit of g/mol, respectively.

The surface area and pore volume are measured by a volumetric measurement method of the adsorption of nitrogen at low temperatures (Brunauer, Emmett and Teller method, or BET method);

the $Na_2O$ content in the molecular sieve and $SiO_2/Al_2O_3$ molar ratio in the molecular sieve are measured by a fluorescence method;

the lattice parameter and relative crystallinity of the molecular sieve are measured by the X-Ray Diffraction (XRD) method, the instrument is a Rigaku Dmax-2500 X-ray diffractometer using Cukα radiation, graphite monocrystal filtering, the operating tube voltage is 35 KV, the tube current is 40 mA, scanning speed (2θ) is 2°/min, scanning range is 4°-35°. The standard sample is the Y-type molecular sieve raw powder used in Example 1 of the present disclosure.

The tail oil yield is calculated from the cutting data of the products' real boiling point;

the BMCI measurement method: BMCI=48640/T+ 473.7d−456.8 d: density (15.6° C.)

T: average boiling point denoted by the absolute temperature K.

Example 1

(1) Taking NaY-type molecular sieve raw powder ($Na_2O$ content is 10 wt. %, $SiO_2/Al_2O_3$ molar ratio is 5.0), mixing it with an ammonium nitrate solution having a concentration of 1.0 mol/L according to a liquid-solid ratio of 3:1, carrying out the ammonium ion exchange at a temperature of 70° C. for 3 h, and repeating the process for 3 times; obtaining the desodiumized Y-type molecular sieve having a $Na_2O$ content of 2.5 wt. %;

(2) contacting the desodiumized Y-type molecular sieve with water vapor at a temperature of 550° C. and a pressure of 0.1 MPa for performing hydrothermal dealuminization for 2 h, repeating the process for once to obtain a hydrothermally dealuminized product;

(3) mixing the hydrothermally dealuminized product with the aluminum sulfate solution having a concentration of 0.5 mol/L according to a liquid-solid ratio of 5:1, and then subjecting to a constant temperature reaction at 80° C. for 2 h to obtain a desodiumized and dealuminated Y-type molecular sieve;

(4) adding the desodiumized and dealuminated Y-type molecular sieve into an aqueous solution of $NaNO_3$ having a concentration of 0.8 mol/L, and subjecting to sodium ion exchange at a temperature of 60° C. for 2 h to obtain a sodium-containing Y-type molecular sieve;

(5) adding the sodium-containing Y-type molecular sieve into an aqueous solution of benzyl tributyl ammonium bromide having a concentration of 0.5 mol/L, performing immersion treatment at a temperature of 70° C. for 3 h;

(6) subjecting the product obtained in step (5) to a drying process at a temperature of 120° C. for 4 h and a calcination process at a temperature of 550° C. for 4 h to prepare the modified Y-type molecular sieve, which is numbered as Y-1.

Example 2

(1) Taking NaY-type molecular sieve raw powder, mixing it with an ammonium chloride solution having a concentration of 2.0 mol/L according to a liquid-solid ratio of 3:1, carrying out the ammonium ion exchange at a temperature of 80° C. for 2 h, and repeating the process for once; obtaining the desodiumized Y-type molecular sieve having a Na$_2$O content of 2.7 wt. %;

(2) contacting the desodiumized Y-type molecular sieve with water vapor at a temperature of 600° C. and a pressure of 0.1 MPa for performing hydrothermal dealuminization for 2 h, repeating the process for once to obtain a hydrothermally dealuminized product;

(3) mixing the hydrothermally dealuminized product with the ammonium fluorosilicate solution having a concentration of 0.4 mol/L according to a liquid-solid ratio of 5:1, and then subjecting to a constant temperature reaction at 90° C. for 2 h to obtain a desodiumized and dealuminated Y-type molecular sieve;

(4) adding the desodiumized and dealuminated Y-type molecular sieve into an aqueous solution of NaNO$_3$ having a concentration of 2.0 mol/L, and subjecting to sodium ion exchange at a temperature of 80° C. for 2 h to obtain a sodium-containing Y-type molecular sieve;

(5) adding the sodium-containing Y-type molecular sieve into an aqueous solution of benzyl tributyl ammonium bromide having a concentration of 1.5 mol/L, performing immersion treatment at a temperature of 70° C. for 3 h;

(6) subjecting the product obtained in step (5) to a drying process at a temperature of 120° C. for 4 h and a calcination process at a temperature of 550° C. for 4 h to prepare the modified Y-type molecular sieve, which is numbered as Y-2.

Example 3

(1) Taking NaY-type molecular sieve raw powder, mixing it with an ammoniumسس sulfate solution having a concentration of 3.0 mol/L according to a liquid-solid ratio of 3:1, carrying out the ammonium ion exchange at a temperature of 80° C. for 2 h, and repeating the process for once; obtaining the desodiumized Y-type molecular sieve having a Na$_2$O content of 2.3 wt. %;

(2) contacting the desodiumized Y-type molecular sieve with water vapor at a temperature of 630° C. and a pressure of 0.1 MPa for performing hydrothermal treatment for 2 h, repeating the process once to obtain a hydrothermally deluminized product;

(3) mixing the hydrothermally dealuminized product with a dilute nitric acid solution having a concentration of 0.6 mol/L according to a liquid-solid ratio of 5:1, and then subjecting to a constant temperature reaction at 95° C. for 2 h to obtain a desodiumized and dealuminated Y-type molecular sieve;

(4) adding the desodiumized and dealuminated Y-type molecular sieve into an aqueous solution of NaNO$_3$ having a concentration of 1.5 mol/L, and subjecting to sodium ion exchange at a temperature of 70° C. for 2 h to obtain a sodium-containing Y-type molecular sieve;

(5) adding the sodium-containing Y-type molecular sieve into an aqueous solution of benzyl tripropyl ammonium bromide having a concentration of 1.2 mol/L, performing immersion treatment at a temperature of 80° C. for 2 h;

(6) subjecting the product obtained in step (5) to a drying process at a temperature of 120° C. for 4 h and a calcination process at a temperature of 550° C. for 4 h to prepare the modified Y-type molecular sieve, which is numbered as Y-3.

Example 4

(1) Taking NaY-type molecular sieve raw powder, mixing it with an ammonium nitrate solution having a concentration of 0.5 mol/L according to a liquid-solid ratio of 3:1, carrying out the ammonium ion exchange at a temperature of 70° C. for 3 h, and repeating the process for 3 times; obtaining the desodiumized Y-type molecular sieve having a Na$_2$O content of 2.5 wt. %;

(2) mixing the desodiumized Y-type molecular sieve with an ammonium fluorosilicate treatment solution having a concentration of 0.2 mol/L according to a liquid-solid ratio of 6:1, and then subjecting to a constant temperature reaction at 80° C. for 2 h;

(3) contacting the product obtained in step (2) with water vapor at a pressure of 0.2 MPa and a temperature of 520° C. for performing hydrothermal treatment for 2 h, and repeating the process for once;

(4) stirring and mixing the product obtained in step (3) with an aluminum sulfate solution having a concentration of 0.6 mol/L according to a liquid-solid ratio of 5:1, and then subjecting to a constant temperature reaction at 75° C. for 2 h to obtain a desodiumized and dealuminated Y-type molecular sieve;

(5) adding the desodiumized and dealuminated Y-type molecular sieve into an aqueous solution of NaNO$_3$ having a concentration of 0.6 mol/L, and subjecting to sodium ion exchange at a temperature of 50° C. for 2 h to obtain a sodium-containing Y-type molecular sieve;

(6) adding the sodium-containing Y-type molecular sieve into an aqueous solution of benzyl tributyl ammonium bromide having a concentration of 0.5 mol/L, performing immersion treatment at a temperature of 60° C. for 5 h;

(7) subjecting the product obtained in step (6) to a drying process at a temperature of 120° C. for 4 h and a calcination process at a temperature of 550° C. for 4 h to prepare the modified Y-type molecular sieve, which is numbered as Y-4.

Comparative Example 1

(1) Taking NaY-type molecular sieve raw powder, mixing it with an ammonium nitrate solution having a concentration of 0.5 mol/L according to a liquid-solid ratio of 3:1, carrying out the ammonium ion exchange at a temperature of 70° C. for 3 h, and repeating the process for 3 times; obtaining the desodiumized Y-type molecular sieve having a Na$_2$O content of 2.5 wt. %;

(2) contacting the ammonium ions exchanged Y molecular sieve with water vapor at a temperature of 550° C. and a pressure of 0.1 MPa for performing hydrothermal treatment for 2 h; and repeating the process for once to obtain a hydrothermally dealuminization product;

(3) mixing the hydrothermally dealuminized product with an aluminum sulfate solution having a concentration of 0.5 mol/L according to a liquid-solid ratio of 5:1, and then subjecting to a constant temperature reaction at 80° C. for 2 h;

(4) subjecting the product obtained in step (3) to a drying process at a temperature of 120° C. for 4 h and a calcination process at a temperature of 550° C. for 4 h to prepare the modified Y-type molecular sieve, which is numbered as B-1.

Comparative Example 2

(1) Taking NaY-type molecular sieve raw powder, mixing it with an ammonium nitrate solution having a concentration of 0.5 mol/L according to a liquid-solid ratio of 3:1, carrying out the ammonium ion exchange at a temperature of 70° C. for 3 h, and repeating the process for 3 times; obtaining the desodiumized Y-type molecular sieve having a Na$_2$O content of 2.5 wt. %;

(2) mixing the product obtained in step (1) with an ammonium fluorosilicate treatment solution having a concentration of 0.2 mol/L according to a liquid-solid ratio of 6:1, and then subjecting to a constant temperature reaction at 80° C. for 2 h;

(3) contacting the product obtained in step (2) with water vapor at a temperature of 520° C. and a pressure of 0.2 MPa for performing hydrothermal treatment for 2 h; and repeating the process for once;

(4) stirring and mixing the molecular sieve obtained in step (3) with an aluminum sulfate solution having a concentration of 0.6 mol/L according to a liquid-solid ratio of 5:1, and then subjecting to a constant temperature reaction at 75° C. for 2 h;

(5) subjecting the product obtained in step (4) to a drying process at a temperature of 120° C. for 4 h and a calcination process at a temperature of 550° C. for 4 h to prepare the modified Y-type molecular sieve, which is numbered as B-2.

Comparative Example 3

(1) Taking 200 g of NaY-type molecular sieve raw powder, mixing it with an ammonium nitrate solution having a concentration of 0.5 mol/L according to a liquid-solid ratio of 3:1, carrying out the ammonium ion exchange at a temperature of 70° C. for 3 h, and repeating the process for 3 times; obtaining the desodiumized Y-type molecular sieve having a Na$_2$O content of 2.5 wt. %;

(2) subjecting the desodiumized Y-type molecular sieve to a hydrothermal treatment at a temperature of 560° C. and a pressure of 0.1 MPa for 2 h;

(3) stirring and mixing the molecular sieve obtained in step (2) with with distilled water according to a liquid-solid ratio of 5:1, and then heating up to 80° C., adding 400 ml of aluminum sulfate solution having a concentration of 0.5 mol/L during the stirring process, and performing a constant temperature reaction at 80° C. for 2 h;

(4) drying the molecular sieve obtained in step (3) at a temperature of 140° C. for 8 min;

(5) placing the molecular sieve obtained in step (4) in a closed container filled with butadiene atmosphere, controlling the pressure at 0.3 MPa to sufficiently contact for 20 min, and then heating in an air atmosphere at a temperature of 200° C. for 15 h;

(6) mixing the molecular sieve obtained in step (5) with distilled water according to a liquid-solid ratio of 5:1, and then adding 100 ml of an ammonium fluorosilicate solution having a concentration of 0.6 mol/L, and treating it at a temperature of 80° C. for 2 h;

(7) subjecting the Y-type molecular sieve treated by the ammonium fluorosilicate in step (6) to a drying process at a temperature of 120° C. for 2 h and a calcination process at a temperature of 550° C. for 4 h to prepare the modified Y-type molecular sieve, which is numbered as B-3.

The properties of the molecular sieves prepared in the aforementioned examples and comparative examples are shown in Table 1.

TABLE 1

| Items | Y-1 | Y-2 | Y-3 | Y-4 | B-1 | B-2 | B-3 |
|---|---|---|---|---|---|---|---|
| Na$_2$O content, % | 1.2 | 0.8 | 1.0 | 1.5 | 0.12 | 0.10 | 0.11 |
| Pore volume, mL/g | 0.42 | 0.50 | 0.46 | 0.39 | 0.42 | 0.38 | 0.36 |
| Specific surface area, m$^2$/g | 720 | 700 | 730 | 760 | 715 | 765 | 740 |
| Crystallinity, % | 92 | 88 | 99 | 110 | 92 | 110 | 98 |
| SiO$_2$/Al$_2$O$_3$ molecular molar ratio | 15 | 35 | 22 | 11 | 15 | 11 | 25 |
| The total acid amount measured by pyridine and infrared spectrometry, mmol/g | 0.52 | 0.35 | 0.43 | 0.60 | 0.70 | 0.93 | 0.68 |
| The total acid amount measured by n-butyl pyridine and infrared spectrometry, mmol/g | 0.49 | 0.34 | 0.40 | 0.55 | 0.49 | 0.55 | 0.43 |
| the ratio between the total acid amount measured by pyridine and infrared spectrometry and the total acid amount measured by n-butyl pyridine and infrared spectrometry | 1.06 | 1.03 | 1.08 | 1.09 | 1.43 | 1.69 | 1.58 |

It can be seen from the data in Table 1 that the modified Y-type molecular sieve prepared with the embodiments of the technical solution provided by the present disclosure has the ratio between the total acid amount measured by pyridine and infrared spectrometry and the total acid amount measured by n-butyl pyridine and infrared spectrometry being within a range of 1-1.2, preferably 1.02-1.15, more preferably 1.05-1.12, particularly preferably 1.03-1.09. The modified Y-type molecular sieve prepared with the comparative examples has the ratio between the total acid amount measured by pyridine and infrared spectrometry and the total acid amount measured by n-butyl pyridine and infrared spectrometry being more than 1.2, which is within a range of 1.4-1.7.

Example 5

The hydrocracking catalyst is prepared by using the modified Y-type molecular sieve prepared in the Examples 1-4 and Comparative Examples 1-3, the catalyst composition is as shown in Table 2:

(1) mixing the modified Y-type molecular sieve and alumina into a carrier mixture, and then adding an aqueous solution of nitric acid with a mass fraction of 20 wt. % into the carrier mixture to form a slurry for performing bar extrusion molding;

(2) drying the bar extrusion product obtained in the step (1) at a temperature of 100° C. for 3 h, and subsequently calcining the dried product at a temperature of 450° C. for 3 h to obtain a silica-alumina carrier;

(3) subjecting the silica-alumina carrier to a saturated inversion in a solution containing a hydrogenation active metal, and drying and calcining the obtained product to prepare a hydrocracking catalyst.

The obtained catalysts are correspondingly numbered as follows: the catalysts C-1 to C-4 are corresponding to the modified Y-type molecular sieves Y-1 to Y-4 of the Examples 1-4; the catalysts BC-1 to BC-3 are corresponding to the modified Y-type molecular sieves B-1 to B-3 of the Comparative Examples 1-3, as shown in Table 2.

TABLE 2

| Numbers | C-1 | C-2 | C-3 | C-4 | BC-1 | BC-2 | BC-3 |
|---|---|---|---|---|---|---|---|
| Molecular sieve | Y-1 | Y-2 | Y-3 | Y-4 | B-1 | B-2 | B-3 |
| Content of molecular sieve, m % | 30 | 50 | 50 | 30 | 30 | 30 | 50 |
| Metal composition and content, m % | | | | | | | |
| $MoO_3$ | 18 | 18 | 18 | 18 | 18 | 18 | 18 |
| NiO | 6 | 6 | 6 | 6 | 6 | 6 | 6 |

Evaluation Example 1

The catalysts C-1 to C-4 and BC-1 to BC-3 are evaluated on a small scale micro-reactor device (100 ml small scale evaluation device of Xytel company in USA). The evaluation device adopts a single-stage, serial and one-pass technological process. The first reactor is charged with a conventional refining catalyst, and the second reactor is separately charged with a hydrocracking catalyst in Table 2. The properties of the reaction feedstock oil are shown in Table 3, and the evaluation results are shown in Table 4 and Table 5.

TABLE 3

| Feedstock oil | Feedstock oil |
|---|---|
| Density, g/cm³ | 0.9024 |
| Distillation range, ° C. | 321-528 |
| C, m % | 86.68 |
| H, m % | 12.30 |
| S, m % | 1.54 |
| N, % | 1138 |
| BMCI value | 40.3 |

TABLE 4

| Catalysts | C-1 | C-2 | C-3 | C-4 | BC-1 | BC-2 | BC-3 |
|---|---|---|---|---|---|---|---|
| Reaction temperature, ° C. | 365 | 370 | 370 | 360 | 362 | 355 | 372 |
| Reaction pressure, MPa | 15.0 | 15.0 | 15.0 | 15.0 | 15.0 | 15.0 | 15.0 |
| Volumetric space velocity, $h^{-1}$ | 1.0 | 1.8 | 1.5 | 1.0 | 1.8 | 1.5 | 1.5 |
| Volume ratio of hydrogen/oil | 1200 | 1200 | 1200 | 1200 | 1200 | 1200 | 1200 |
| Nitrogen content of refined oil, ppm | 6 | 6 | 6 | 6 | 6 | 6 | 6 |
| Conversion rate of a single distillation, m % | 65 | 70 | 74 | 65 | 65 | 65 | 75 |
| Chemical hydrogen consumption, m % | 2.30 | 2.35 | 2.40 | 2.34 | 2.43 | 2.50 | 2.48 |

TABLE 5

| Catalysts | C-1 | C-2 | C-3 | C-4 | BC-1 | BC-2 | BC-3 |
|---|---|---|---|---|---|---|---|
| Product distribution, m % | | | | | | | |
| Yield of $C_5^+$ liquid products, m % | 97.8 | 98.2 | 97.9 | 97.4 | 95.5 | 94.0 | 95.80 |
| Yield of tail oil (>350° C.), m % | 35 | 30 | 25 | 35 | 35 | 35 | 25 |
| Properties of product | | | | | | | |
| Tail oil (>350° C.) | | | | | | | |
| BMCI | 5.5 | 4.4 | 4.2 | 6.0 | 7.3 | 8.5 | 6.8 |

It can be seen from the results of Table 5 that the hydrocracking catalysts C-1 to C-4 are prepared with the modified Y-type molecular sieves provided by Examples 1-4 of the present disclosure, wherein the molecular sieves have an optimized distribution of acid centers and reduced amount of acid centers in the micropores; when the hydrocracking reaction is carried out, the BMCI value of the obtained hydrocracking tail oil product is significantly lower than the result of reaction performed with the modified Y-type molecular sieves (the ratio between the total acid amount measured by pyridine and infrared spectrometry and total acid amount measured by n-butyl pyridine and infrared spectrometry is greater than 1.2) in the Comparative Examples 1-3, and the yield of $C_5^+$ liquid products is more than the reaction result of the catalyst of the Comparative Examples.

Furthermore, the Comparative Example 3 provides a modified Y-type molecular sieve in the prior art, wherein a silica-alumina ratio is used for modifying the bulk phase and surface of the Y-type molecular sieve particles. Although the modification method alters the silica-alumina ratio of a portion of the molecular sieve so as to affect the acid amount of the molecular sieve, the method cannot change the distribution of the acid center sites in the large pore channels and micropores on the Y-type molecular sieve, and the acid center sites in the micropores still expose, the acid ratio between the amount of pyridine and the acid amount of n-butyl pyridine is greater than 1.2, which does not reduce the possibility that the hydrocarbon molecules entering the micropores subject to secondary cracking reaction at the acid center sites, the Y-type molecular sieve used in the hydrocracking cannot improve quality of hydrocracking tail oil and increase yield of the reaction liquid products.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A modified Y-type molecular sieve, comprising 0.5-2 wt. % of $Na_2O$ based on a total amount of the modified Y-type molecular sieve, wherein a ratio between a total acid amount measured by pyridine and infrared spectrometry of the modified Y-type molecular sieve and a total acid amount measured by n-butyl pyridine and infrared spectrometry of the modified Y-type molecular sieve is 1-1.2 and the total acid amount measured by pyridine and infrared spectrometry of the modified Y-type molecular sieve is 0.1-1.2 mmol/g.

2. The modified Y-type molecular sieve of claim 1, wherein the modified Y-type molecular sieve contains 0.8-1.8 wt. % of $Na_2O$ based on the total amount of the modified Y-type molecular sieve, the ratio between the total acid amount measured by pyridine and infrared spectrometry of the modified Y-type molecular sieve and the total acid amount measured by n-butyl pyridine and infrared spectrometry of the modified Y-type molecular sieve is 1.02-1.1501, and the total acid amount measured by pyridine and infrared spectrometry of the modified Y-type molecular sieve is 0.2-1 mmol/g.

3. The modified Y-type molecular sieve of claim 2, wherein the modified Y-type molecular sieve contains 1-1.5 wt. % of $Na_2O$ based on the total amount of the modified Y-type molecular sieve, the ratio between the total acid amount measured by pyridine and infrared spectrometry of the modified Y-type molecular sieve and the total acid amount measured by n-butyl pyridine and infrared spectrometry of the modified Y-type molecular sieve is 1.05-1.12, and the total acid amount measured by pyridine and infrared spectrometry of the modified Y-type molecular sieve is 0.3-0.8 mmol/g.

4. The modified Y-type molecular sieve of claim 1, wherein the modified Y-type molecular sieve has a specific surface area of 500-900 $m^2/g$, a pore volume of 0.28-0.7 mL/g, a relative crystallinity of 50%-130% a lattice parameter of 2.425-2.45 nm and a silica-alumina molar ratio within a range of (6-80):1.

5. The modified Y-type molecular sieve of claim 4, wherein the modified Y-type molecular sieve has a specific surface area of 550-850 $m^2/g$, a pore volume of 0.3-0.65 mL/g, a relative crystallinity of 60%-110%, a lattice parameter of 2.428-2.448 nm, and a silica-alumina molar ratio within a range of (8-60):1.

6. The modified Y-type molecular sieve of claim 5, wherein the modified Y-type molecular sieve has a specific surface area of 600-750 $m^2/g$, a pore volume of 0.35-0.6 mL/g, a relative crystallinity of 70%-100%, a lattice parameter of 2.43-2.445 nm, and a silica-alumina molar ratio within a range of (10-50):1.

7. A method for preparing the modified Y-type molecular sieve of claim 1, comprising:
(1) pretreating a NaY molecular sieve to obtain a desodiumized and dealuminated Y-type molecular sieve;
(2) subjecting the desodiumized and dealuminated Y-type molecular sieve to sodium ion exchange to obtain a sodium-containing Y-type molecular sieve;
(3) immersing the sodium-containing Y-type molecular sieve in a macromolecular ammonium salt solution; and
(4) subjecting the sodium-containing Y-type molecular sieve obtained from step (3) to drying and calcination to obtain the modified Y-type molecular sieve.

8. The method of claim 7, wherein step (2) comprises subjecting the desodiumized and dealuminated Y-type molecular sieve to reaction with an aqueous solution of $NaNO_3$ at a temperature of 40-80° C. for 1-4 h, and a mass fraction of $NaNO_3$ in the aqueous solution of $NaNO_3$ is 0.1-3 wt. %.

9. The method of claim 7, wherein step (3) comprises immersing the sodium-containing Y-type molecular sieve in the macromolecular ammonium salt solution at a temperature of 40-80° C. for 2-6 h and the macromolecular ammonium salt is a benzyl quaternary ammonium salt.

10. The method of claim 7, wherein the drying process in step (4) is carried out at a temperature of 100-150° C. for 1-4 h, and the calcination process is carried out at a temperature of 500-700° C. for 2-6 h.

11. The method of claim 7, wherein the pretreatment process in step (1) comprises one process selected from ammonium ion exchange, hydrothermal dealumination, aluminum salt dealumination, fluorosilicate dealumination, acid dealumination, and a combination thereof.

12. The method of claim 11, wherein the pretreatment process in step (1) comprises the following steps:
(a) subjecting the NaY molecular sieve and an ammonium salt aqueous solution to an ammonium ion exchange reaction to obtain a desodiumized Y-type molecular sieve;
(b) hydrothermally dealuminating the desodiumized Y-type molecular sieve to obtain a hydrothermally dealuminized product; and
(c) subjecting the hydrothermally dealuminized product to a chemical dealumination to prepare the desodiumized and dealuminated Y-type molecular sieve,
wherein the chemical dealumination is aluminum salt dealumination, fluorosilicate dealumination, or acid dealumination.

13. The method of claim 12, wherein step (a) comprises carrying out exchanging process of the NaY molecular sieve with the ammonium salt aqueous solution at a temperature 60-120° C. for 1-3 h for 1-4 times to obtain the desodiumized Y-type molecular sieve, and the desodiumized Y-type molecular sieve contains less than 3 wt. % of $Na_2O$,
wherein the NaY molecular sieve has a $SiO_2/Al_2O_3$ molar ratio within a range of (3-6):1 and a $Na_2O$ content of 6-12 wt. %, the ammonium salt is one or more selected from the group consisting of ammonium chloride, ammonium nitrate, ammonium sulfate, ammonium acetate, and ammonium oxalate, and a molar concentration of the aqueous solution of ammonium salt is 0.3-6 mol/L.

14. The method of claim 12, wherein step (b) comprises contacting the desodiumized Y-type molecular sieve with water vapor at a temperature of 520-700° C. and at a pressure of 0.01-0.5 MPa for 1-6 h for 1-3 times.

15. The method of claim 12, wherein step (c) comprises subjecting the hydrothermal dealuminization product to a constant temperature reaction with an aluminum salt solution, an ammonium fluorosilicate solution, or a nitric acid solution at a temperature of 50-120° C. for 0.5-3 h.

16. A hydrocracking catalyst comprising a silica-alumina carrier and a hydrogenation active metal, wherein, based on a total amount of the hydrocracking catalyst, a content of the silica-alumina carrier is 55-85 wt. %, and a content of the hydrogenation active metal is 15-45 wt. % on the basis of metal oxide, wherein the silica-alumina carrier contains the modified Y-type molecular sieve of claim 1, and a content of the modified Y-type molecular sieve in the silica-alumina carrier is 5-90 wt. %.

17. The hydrocracking catalyst of claim 16, wherein the hydrogenation active metal is selected from Group VIII and Group VI in the periodic table, and the hydrocracking catalyst contains, on the basis of metal oxide, 3-15 wt. % of the Group VIII metal and 10-40 wt. % of the Group VI metal, based on the total amount of the hydrocracking catalyst.

18. The hydrocracking catalyst of claim 17, wherein the hydrogenation active metal is selected from Ni, Co, W, Mo, and mixtures thereof.

19. The method of claim 9, wherein the benzyl quaternary ammonium salt is selected from benzyl tripropyl ammonium bromide, benzyl tributyl ammonium bromide, benzyl tripropyl ammonium chloride, benzyl tributyl ammonium chloride, and mixtures thereof.

20. The method of claim 15, wherein the aluminum salt solution, the ammonium fluorosilicate solution, or the nitric acid solution has a molar concentration within a range of 0.05-2 mol/L.

* * * * *